United States Patent [19]
Kuroiwa et al.

[11] Patent Number: 4,752,820
[45] Date of Patent: Jun. 21, 1988

[54] OPTICAL RECORDING MEDIUM HAVING A LIQUID CRYSTAL LAYER

[75] Inventors: Akihiko Kuroiwa; Shigeru Asami; Toshiki Aoi; Kazuo Takahashi; Kenryo Namba, all of Tokyo, Japan

[73] Assignee: TDK Corporation, Tokyo, Japan

[21] Appl. No.: 706,447

[22] Filed: Feb. 27, 1985

[30] Foreign Application Priority Data

Feb. 27, 1984 [JP] Japan ................................ 59-035686
Feb. 15, 1985 [JP] Japan ................................ 60-027988

[51] Int. Cl.⁴ ........................ G11C 13/04; G02F 1/13; G01D 9/00
[52] U.S. Cl. ................................ 365/108; 346/135.1; 350/351
[58] Field of Search ..................... 365/108; 346/135.1; 350/330, 351

[56] References Cited

U.S. PATENT DOCUMENTS

| | | | |
|---|---|---|---|
| 3,894,794 | 7/1975 | Mitchell, Jr. | 365/108 |
| 4,514,045 | 4/1985 | Huffman et al. | 350/351 |
| 4,581,317 | 4/1986 | Simmons, III | 346/135.1 |
| 4,622,654 | 11/1986 | Yaniv et al. | 365/108 |

Primary Examiner—Terrell W. Fears
Assistant Examiner—Melissa J. Koval
Attorney, Agent, or Firm—Oblon, Fisher, Spivak, McClelland & Maier

[57] ABSTRACT

An optical recording medium comprising a pair of substrates each having an electrode, the space between the substrate is filled with a high-dielectric liquid crystal to form a rewritable recording layer. The recording medium comprises radiation absorbing means to provide a change of directional orientation of the liquid crystal upon exposure to a laser beam.

13 Claims, 1 Drawing Sheet

OPTICAL RECORDING MEDIUM HAVING A LIQUID CRYSTAL LAYER

BACKGROUND OF THE INVENTION

This invention relates to optical recording media, and more particularly, to optical recording media having a liquid crystal layer.

In these years, great activities are concentrated on the development of erasable, rewritable optical recording media. One known example of such optical recording media utilizes the phase transition of liquid crystal [see SPIE, 420, 194–199 (1983)]. In this typical example, liquid crystal, typically smectic liquid crystal is sandwiched between a light absorbing electrode layer on a substrate and a transparent electrode layer on a transparent substrate. A laser beam is directed to the medium from above the transparent substrate under a certain electric field across the electrodes and the light absorbing electrode layer then absorbs radiation to produce heat. Phase transition, for example, for smectic to nematic takes place in the exposed spot at an elevated temperature. Upon removal of the beam, the heated spot is quenched so that the phase transition is kept unchanged. A recorded spot is formed in this way to complete writing. Read-out may be carried out by directing a reading laser beam to the recorded medium where light scattering occurs at recorded spots.

Erasing may be carried out by applying an electric field across the electorodes of the recorded medium or heating and gradual cooling, thereby inducing phase transition back to the original phase, for example, smectic phase. Alternatively, erasing operation may be carried out by applying a laser beam under a certain voltage applied across the electrodes or by heating without any voltage. The medium is ready for writing, that is, rewritalble.

Preferably, the liquid crystal layer contains a dichroic dye. A layer of aligner may be provided between the electrode layer and the liquid crystal layer to assist in the alignment of liquid crystal molecules.

These media generally use a light-absorbing electrode layer formed of metal, for example, Cr, Cr alloy, Au, Al, etc. which is rather less sensitive to light, resulting in some disadvantages including low recording sensitivity and low S/N ratio upon reading out.

The inventors have found that nematic and smectic liquid crystals are not fully satisfactory in directional orientation or sensitivity and S/N ratio. There is a need for further improving the sensitivity, S/N ratio, storage life, and other properties of the liquid crystal layer of optical recording media.

SUMMARY OF THE INVENTION

It is, therefore, an object of the present invention to provide an improved rewritable optical recording medium of the heat mode having a liquid crystal layer.

Another object of the present invention is to provide such an optical recording medium having improved recording sensitivity and reading S/N ratio.

According to the present invention, there is provided an optical recording medium comprising a substrate having an electrode layer thereon; a transparent substrate having a transparent electrode layer thereon; an optical recording layer disposed between the electrode layers and containing a liquid crystal; and means capable of absorbing radiation to produce sufficient heat to provide a change of directional orientation of the liquid crystal. According to the feature of the present invention, the liquid crystal is a high-dielectric liquid crystal.

In preferred embodiments of the invention, the radiation absorbing means comprises (1) a radiation absorbing layer applied onto the electrode layer on the substrate, (2) a radiation absorbing, electroconductive layer which also serves as the electrode layer, or (3) a dye, typically dichroic dye which is contained in the recording layer along with the liquid crystal. In the most preferred embodiment, a phthalocyanine is applied onto the substrate to form a radiation-absorbing electrode layer.

BRIEF DESCRIPTION OF THE DRAWINGS

The above and other objects, features, and advantages of the present invention will be more fully understood by reading the following description taken in conjunction with the accompanying drawings, in which.

It should be noted that the drawings are not drawn on actual scale or proportion because they are intended to facilitate the understanding of the construction of the recording medium of the invention.

DESCRIPTION OF THE PREFERRED EMBODIMENTS

Figure 1:
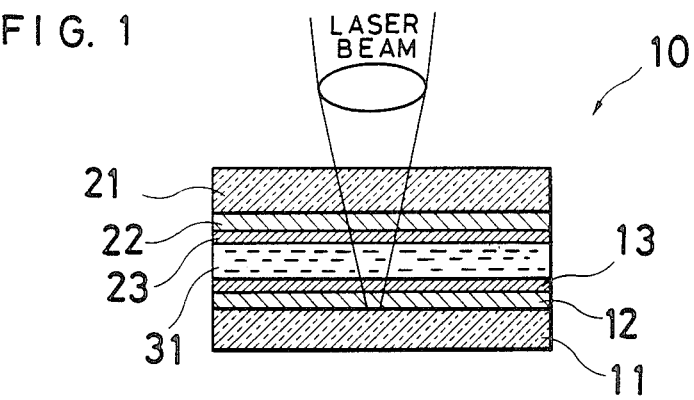
FIG. 1 is a schematic cross-sectional view of an optical recording medium according to the present invention.

Referring to FIG. 1 there is schematically illustrated in cross section one embodiment of the optical recording medium according to the present invention. The recording medium is illustrated as comprising a pair of substrates and electrodes, that is, a first substrate 11 having thereon an electrode layer 12, preferably a light absorbing electrode layer, and a second, preferably transparent substrate 21 having thereon a transparent electrode layer 22. A recording layer 31 of liquid crystal is sandwiched between the electrode layer 12 on the substrate 11 and the transparent electrode layer 22 on the transparent substrate 21. In the illustrated embodiment, layers 13 and 23 of an aligner are applied to the electrode layers 12 and 22, respectively, to assist in the directional orientation of liquid crystal molecules.

The first substrate 11 may be formed of any insulating material, for example, glass, resins such as polycarbonate and epoxy resins, photosensitive resins, and metals and is provided on one of its major surfaces with the electrode layer 12.

Preferably, the electrode layer itself may also serve as a light absorbing layer. The preferred light absorbing agent is a phthalocyanine. Then the electrode layer may preferably be formed of a phthalocyanine alone. Other examples of the radiation-absorbing, electroconductive materials from which the light-absorbing electrode layers can be formed include CdTe, Cd, CdS, GaAs, GaSe, SbSe, and various organometallic compounds. In many cases, the light absorbing layer is separately formed on the electrode layer. In general, the electrode layer is formed from metal oxides such as indium tin oxide (ITO), indium oxide, tin oxide, etc.; single metals such as Al, Au, Cr, Pb, etc.; alloys such as chromium alloys;

thin films of alloys of rare earth metals such as Gd, Tb, Dy, Ho, etc. with transition metals such as Fe, Co, etc., for example, TbFeCo, TbDyFe, GdTbFe, GdFe, GdCo, TbFe, GdFe, TbFeO$_3$, etc.; alloys such as MnBi, MnCuBi, etc.; chalcogenides such as SbSe, TeAsGe, TeO$_x$, etc. to a thickness of the order of 0.01 to 2 μm. A light absorbing layer is applied onto the electrode layer, the light absorbing layer being formed of any of dyes, for example, phthalocyanines, cyanines, squariliums, anthraquinones, etc., chalcogenides, for example, TeSe, TeC, TeO$_x$, SbSe, etc., and various metals and alloys in thin film form.

The phthalocyanines which can be used to form the light absorbing layer are not particularly limited. Examples of the central atoms coordinated in the phthalocyanines include Cu, Fe, Co, Ni, In, Ga, Al, InCl, InBr, InI, GaCl, GaBr, GaI, AlCl, AlBr, Ti, TiO, Si, Ge, H, H$_2$, Pb, VO(vanadyl), Mn, Sn, etc. The phthalocyanines may have substituents attached to their benzene rings directly or via a suitable linkage, examples of the substituents including —OH, halogens, —COOH, —NH$_2$, —COCl, —COOR, —OCOR, —SO$_2$Cl, —SO$_3$H, —CONH$_2$, —CN, —NO$_2$, —SCN, —SH, —CH$_2$Cl, etc. where R is selected from alkyls and aryls.

Further, the phthalocyanines may be attached to polymer chains such as polystyrene, polyvinyl alcohol, styrene-vinyl pyridine copolymers, polybenydylglutamate, via a divalent linkage such as —COO—, —OCO—, —CONH—, —NHCOO—, —SO$_2$—, —SO$_2$NH—, —O—, etc. optionally combined with alkyl radicals, or they may be incorporated into polymers such as polyamides, polyimides, polyesters, polyurethanes, epoxy resins, polyvinyl alcohols, polyacrylic acid, silicone resins by polymerization or condensation in two or three dimensional structure.

The light absorbing layer, typically phthalocyanine layer on the electrode layer generally has a thickness of the order of 0.005 to 5 μm and may be formed by any suitable technique such as evaporation, sputtering, and coating.

The light absorbing layer may further contain conductive aids such as I$_2$, HCl, H$_2$SO$_4$, etc., optical dopants, dyes, for the purpose of increasing electrical conductivity and/or optical properties particularly when it is a dye layer, and may further contain other polymers or oligomers, plasticizers, surface active agents, antistatic agents, stabilizers, crosslinking agents, catalysts, initiators, sensitizers, orienting agents, orientation processing agents, and the like.

When radiation-absorbing agents such as dyes are contained in the liquid crystal layer as will be described later, the electrode layer on the first substrate may not necessarily serve as a light absorbing layer or bear a light absorbing layer thereon.

The second substrate is a transparent substrate which may be formed from any transparent material such as glass and transparent resins such as polycarbonates, acrylic resins, epoxy resins, and other photo-cured resins. On the second substrate, a transparent or translucent electrode layer is formed from various metals such as indium oxide, indium tin oxide (ITO), tin oxide, Al, Au, Cr, Cr alloys, Pb, etc. to a thickness of the order of 0.001 to 10 μm.

Referring to FIG. 1 again, the first and second substrates 11 and 21 are asembled via a spacer (not shown) such that the electrode layers 12 and 22 thereon face each other, forming a cell. The cell, more particularly, the space defined between the opposed electrodes layers 12 and 22 is filled with liquid crystal.

According to the present invention, the liquid crystal contained in the cell is a high-dielectric liquid crystal. Typical of the high-dielectric liquid crystals are smectic liquid crystals having a chiral carbon (to be referred to chiral smectic liquid crystal, hereinafter). The term "high-dielectric" is intended to mean that liquid crystal molecules have electric dipole moments aligned in a certain direction and exhibit spontaneous polarization.

Illustrative examples of the high-dielectric liquid crystals which can be used herein are shown below. The chiral carbon is represented by *C.

(1) Azomethine compounds

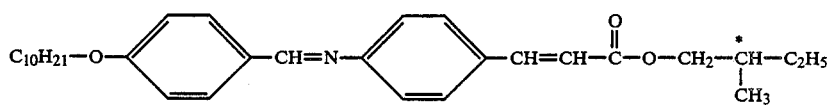

LC1

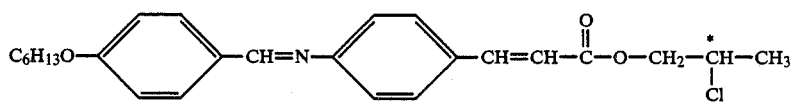

LC2

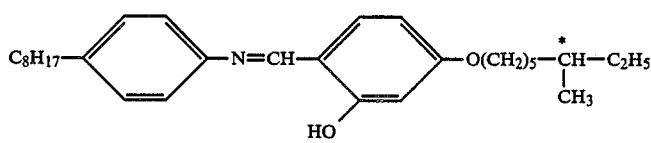

LC3

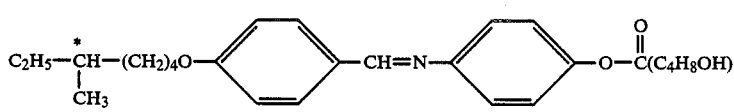

LC4

-continued
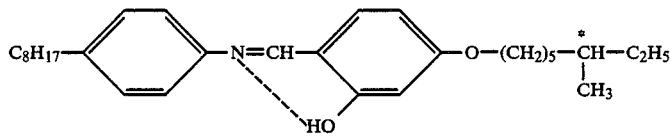
LC5
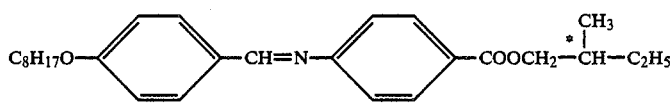
LC6
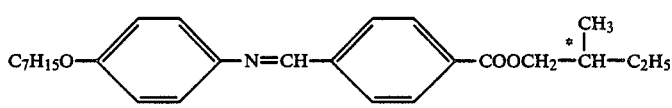
LC7
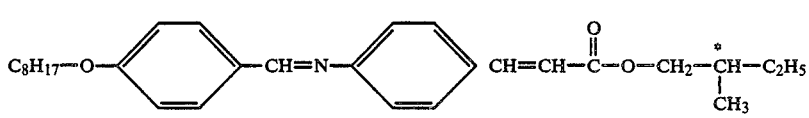
LC8
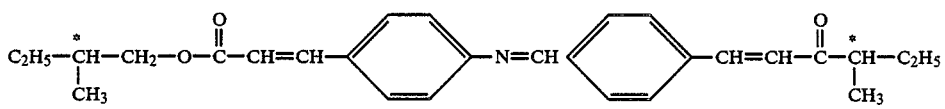
LC9
(2) Azoxy compounds
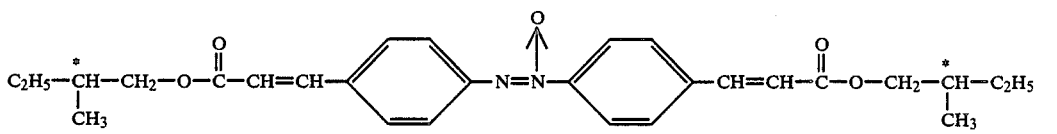
LC10
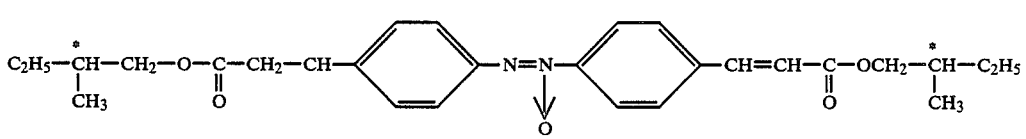
LC11
(3) Ester compounds
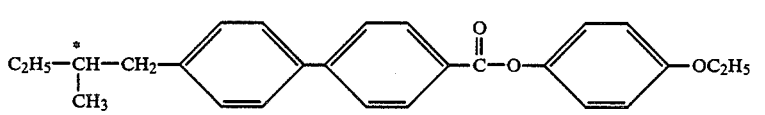
LC12
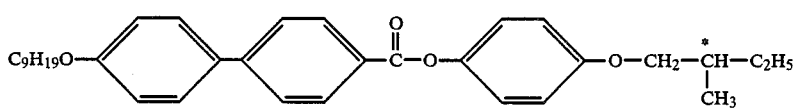
LC13
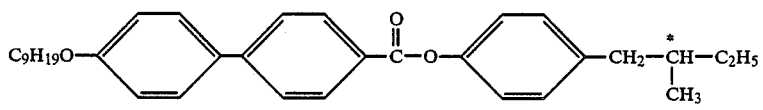
LC14
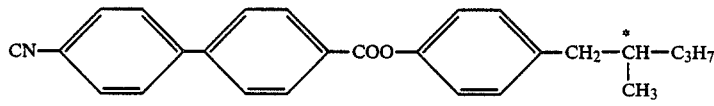
LC15
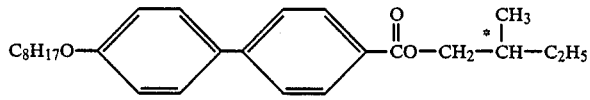
LC16

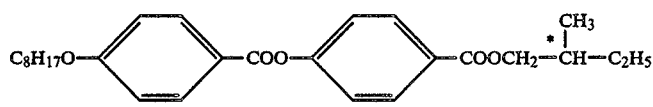
LC17

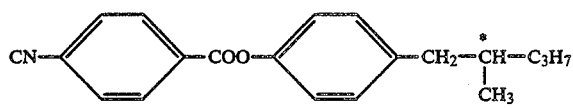
LC18

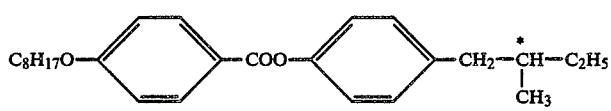
LC19

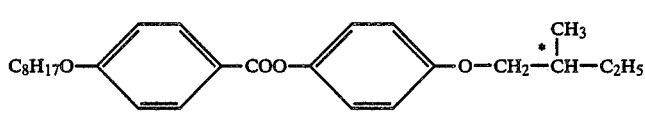
LC20

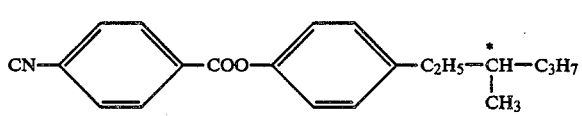
LC21

(4) Azo compounds

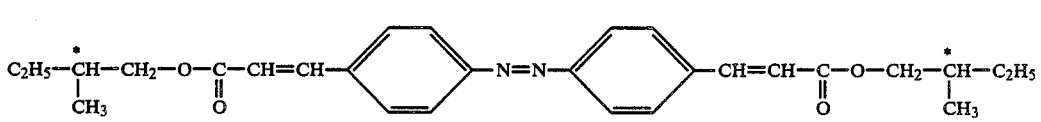
LC22

(5) Phenylcyclohexane compounds

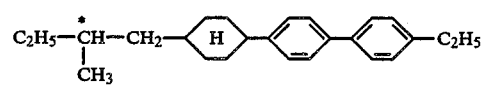
L C 23

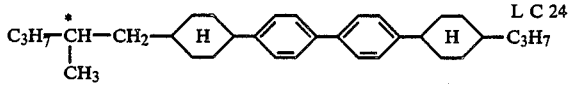
L C 24

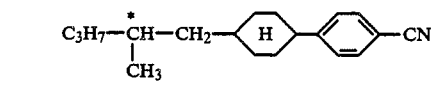
L C 25

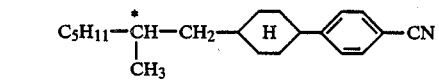
L C 26

(6) Cyclohexyl cyclohexane compounds

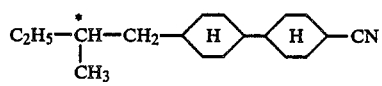
L C 27

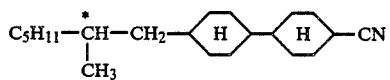
L C 28

L C 29

(7) Cyano bi- or ter-phenyl compounds

L C 30

L C 31

L C 32

The cells are filled with these liquid crystals alone or in admixture and optionally, in combination with any desired additives which may be other liquid crystals such as nematic, smectic or cholesteric liquid crystals or high molecular weight liquid crystals, suitable electrolytes, and dyes, typically dichroic dyes as will be described later. Alternatively, these liquid crystals optionally combined with any of the foregoing additives may be dissolved in solvents for example, ketones such as methyl ethyl ketone, methyl isobutyl ketone, cyclohexanone, etc.; esters such as butyl acetate, ethyl acetate, carbitol acetate, butyl carbitol acetate, etc.; ethers such as methyl cellosolve, ethyl cellosolve, etc.; aromatics such as toluene, xylene, etc.; haloalkyls such as dichloroethane, etc.; and alcohols before they are contained in the cell by a coating technique such as spin coating and dip coating.

In some instances, the liquid crystal composition is once heated into liquid state so that it may be readily introduced into the cell and then gradually cooled to create a phase. If required, electric or magnetic field may be applied during the process.

The liquid crystal layer generally has a thickness of the order of 0.01 to 100 μm.

In one preferred embodiment of the present invention, the liquid crystal layer further contains at least one dye as a radiation absorbing agent, resulting in increased sensitivity. The preferred dyes are dichroic dyes, phthalocyanines, cyanines, squariliums, and anthraquinones as previously mentioned.

Preferred examples of the dichroic dyes used herein are shown below.

1. Merocyanine dyes

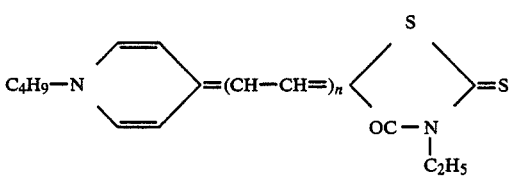
D 1

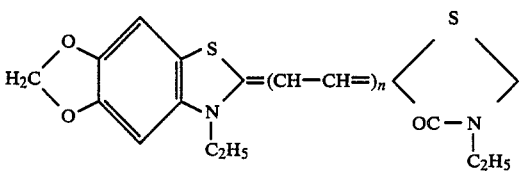
D 2

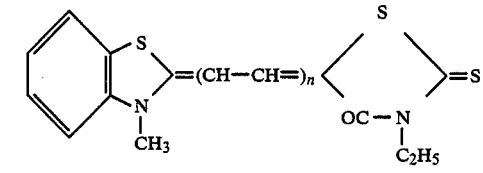
D 3

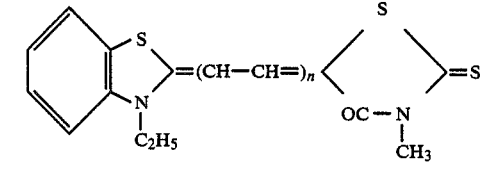
D 4

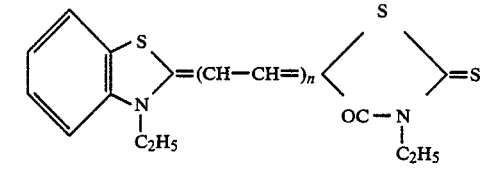
D 5

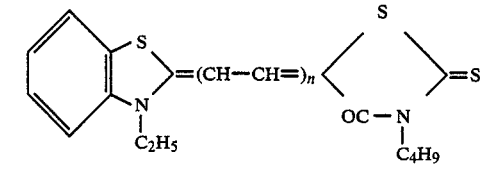
D 6

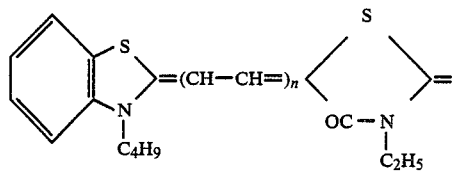
D 7

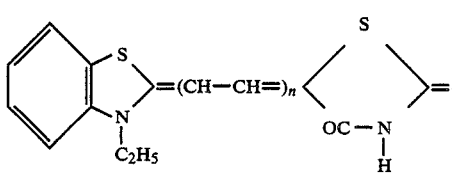
D 8

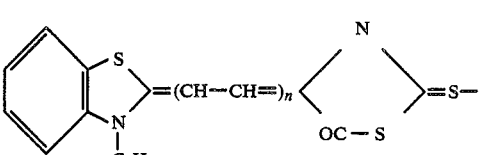
D 9

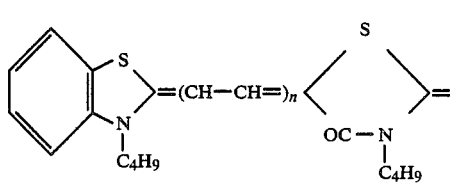
D 10

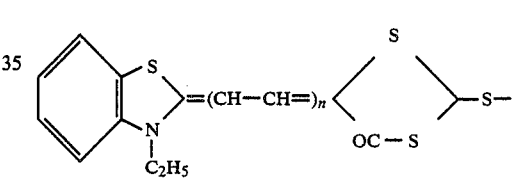
D 11

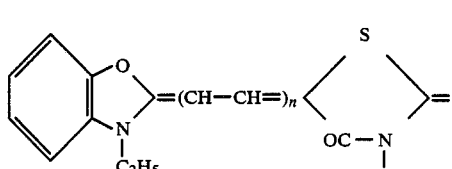
D 12

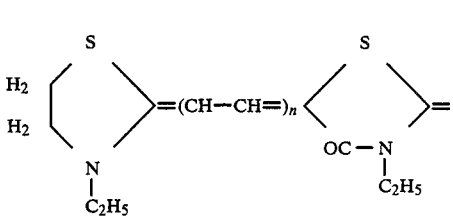
D 13

2. Anthraquinone dyes

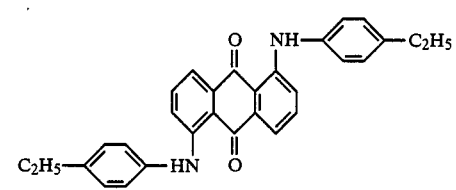
D14

-continued
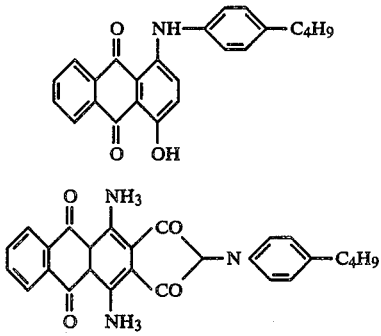
D15
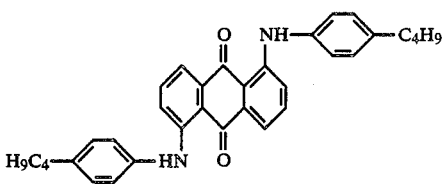
D17
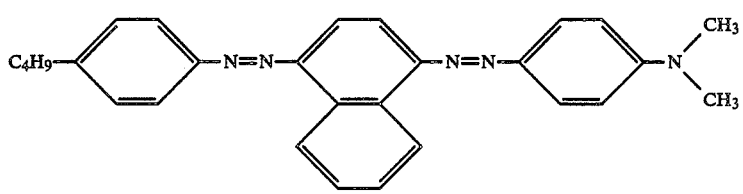
D16
3. Azo dyes
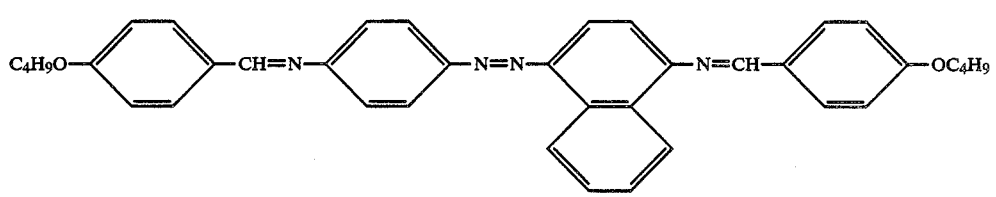
D18
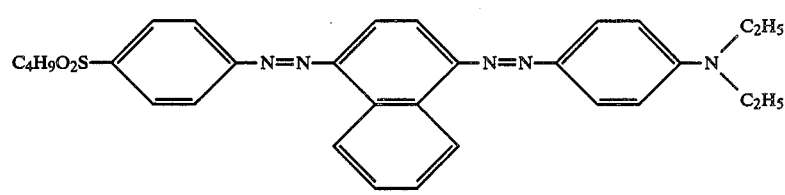
D19
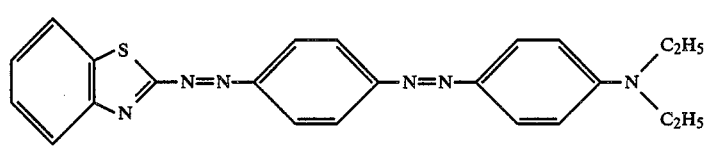
D20
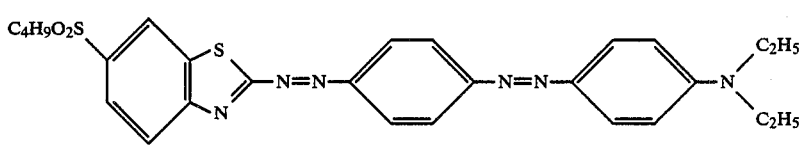
D21
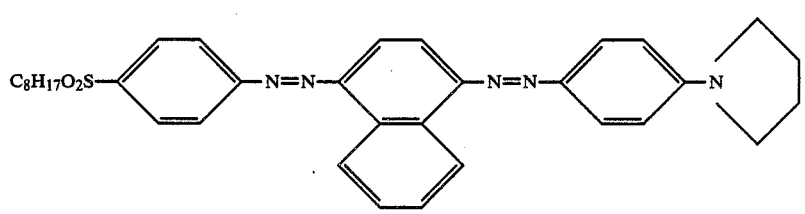
D22
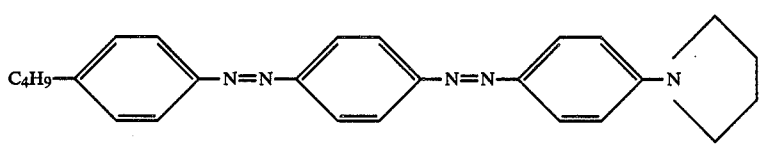
D23
D24

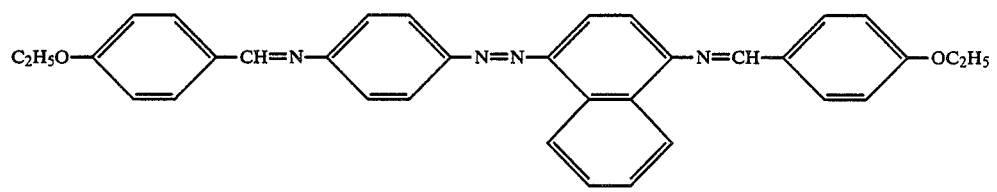
D25
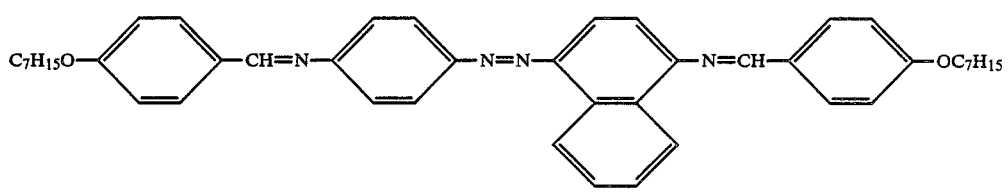
D26
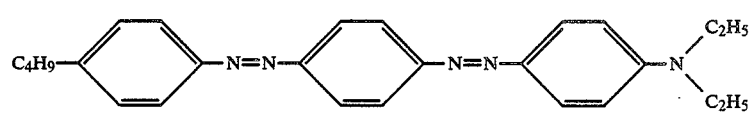
D27
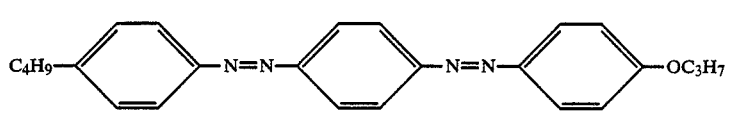
D28
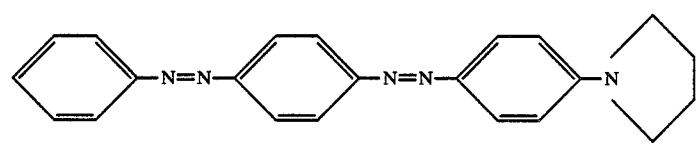
D29
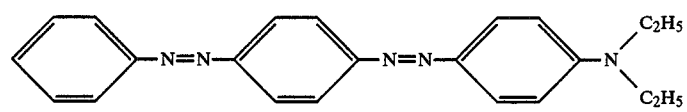
D30
D31
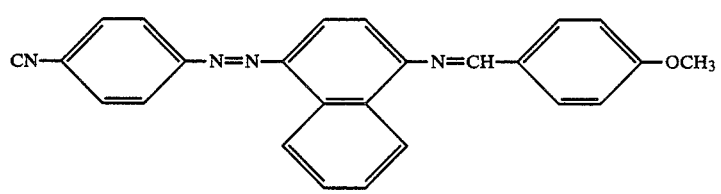
D32
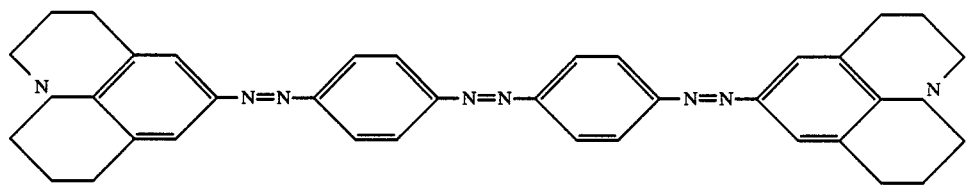
D33
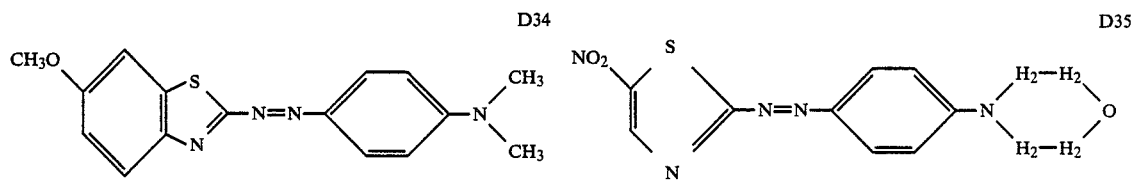
D34　　D35

-continued
D36 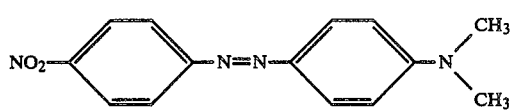
D37 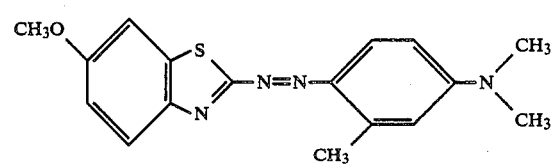
D38 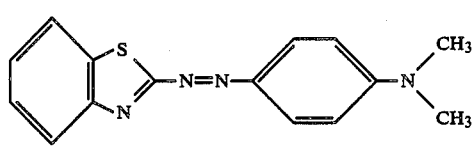
D39 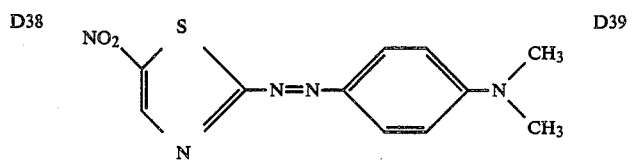
D40 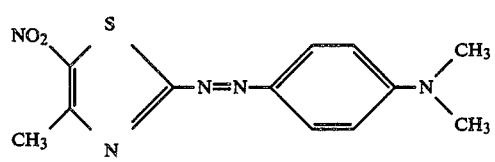
D41 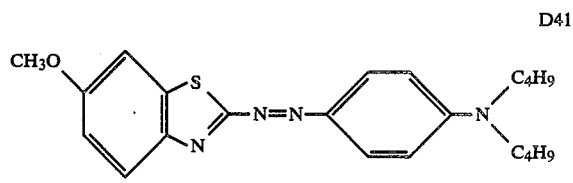
D42 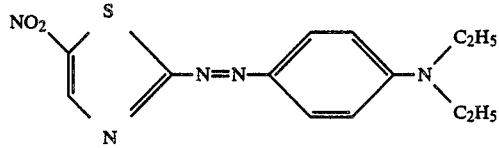
D43 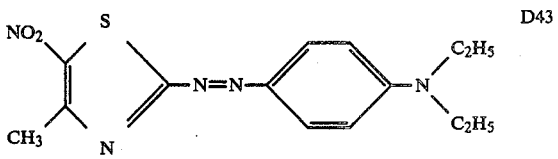
D44 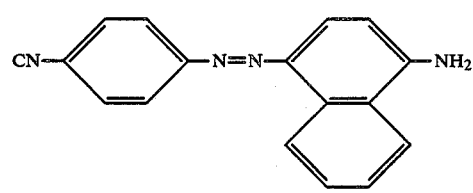
D45 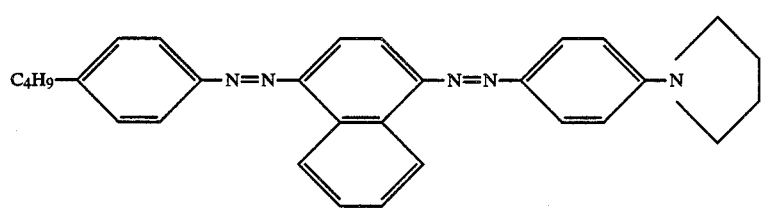
D46 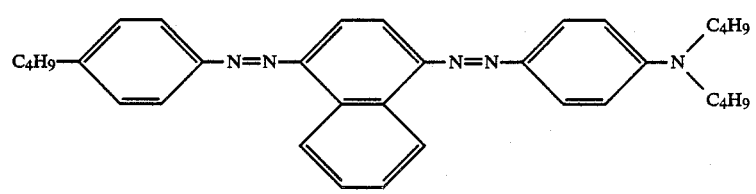
D47 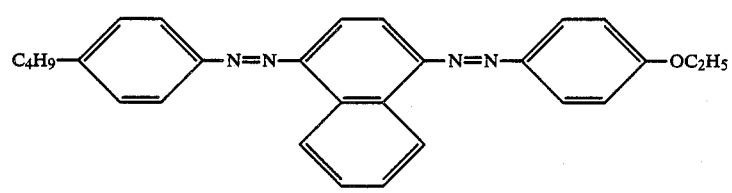

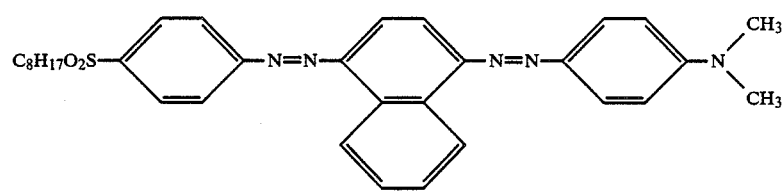
D48
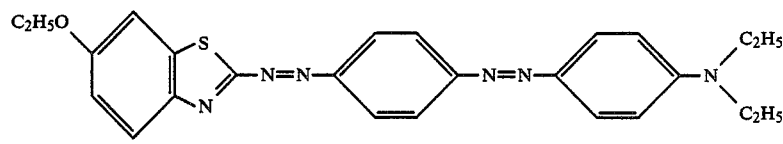
D49
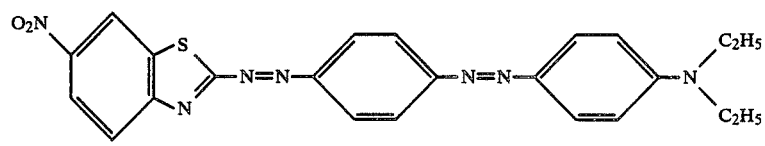
D50
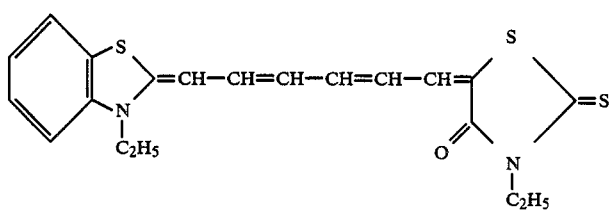
D51
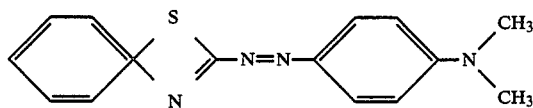
D52
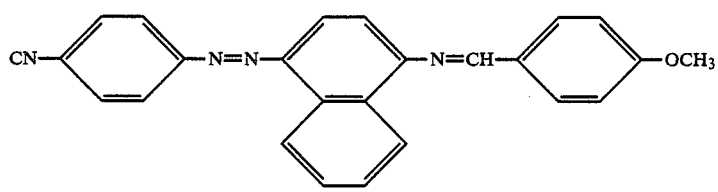
D53
D54 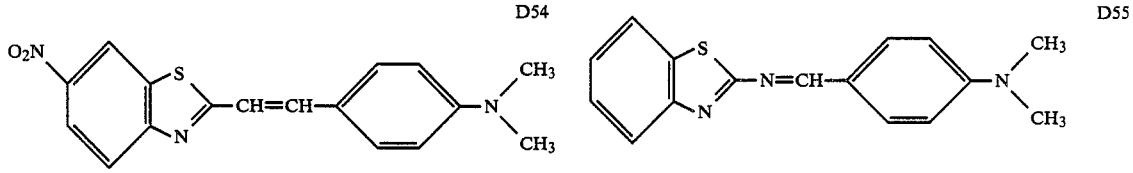 D55
D56 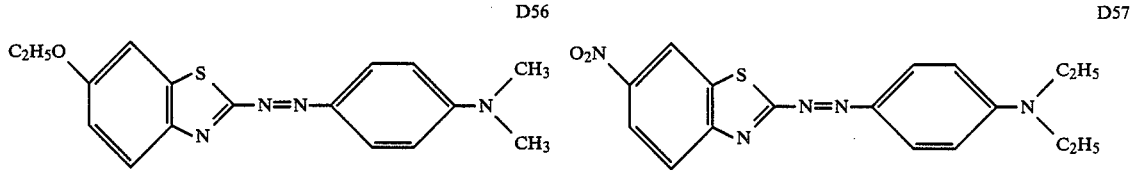 D57
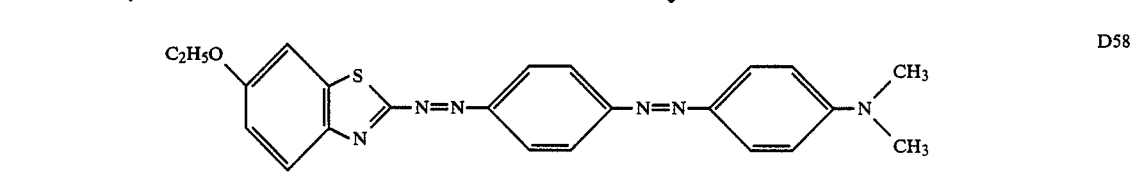
D58
4. Styryl dyes

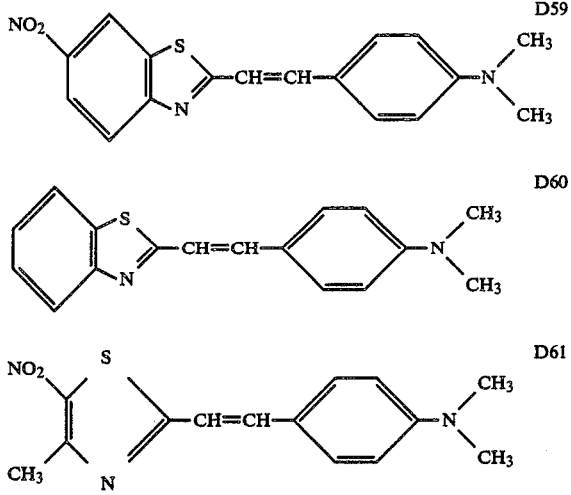

5. Azomethine dyes

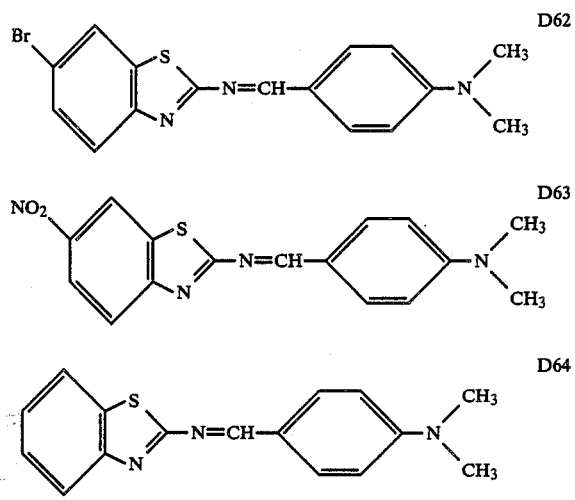

6. Tetrazine, methine, squarilium and other dyes

Another example of the dye which can be mixed with liquid crystal to increase the sensitivity of the recording medium is a phthalocyanine as previously mentioned in conjunction with the light absorbing material.

The liquid crystal and the dye are mixed in a molar ratio between 1:0.01 and 1:0.8.

The liquid crystal layer may optionally contain other additives, for example, orienting agents, polymers and oligomers such as polycarbonates, plasticizers, stabilizers, quenchers and the like.

As shown in FIG. 1, the layers 13 and 23 of aligner are preferably applied onto the electrode layers 12 and 22 on the first and second substrates 11 and 21, respectively, in order to assist in the directional orientation of liquid crystal molecules and hence, improving the sensitivity. Preferably, the aligner 13 on the first substrate 11 is of parallel orientation type and the aligner 23 on the second substrate 21 is of parallel or vertical orientation type.

Preferred examples of the aligners which may be used in the practice of the present invention are listed below.
(1) Solution coating (physical adsorption)
  (1-a) Perpendicular orientation
  Lecithin, stearic acid, CTAB (hexadecyl trimethyl ammonium bromide), octadecylamine hydrochloride, etc.
  (1-b) Parallel orientation
  Carbon, polyoxyethylene, Versamid 125 (trade mark of thermoplastic and reactive polyamide resin, General Mills Chemicals, Inc.), polyvinyl alcohol, polyimides, etc.
(2) Solution coating (chemical adsorption)
  (2-a) Perpendicular orientation
  Chromium complexes of monobasic carboxylic acids (for example, chromium complexes of myristic acid and perfluorononanoic acid), organic silanes (for example, DMOAP), etc.
  (2-b) Parallel orientation
  Chromium complexes of dibasic carboxylic acids (for example, chromium complex of brassylic acid), organic silanes (for example, MAP), etc.
(3) Plasma polymerization
  (3-a) Perpendicular orientation
  Hexamethyl disiloxane, perfluorodimethyl cyclohexane, tetrafluoroethylene, etc.
  (3-b) Parallel orientation
  Acetylene, etc.
(4) Sputtering type
  (4-a) Perpendicular orientation
  Polytetrafluoroethylene, etc.
(5) Liquid crystal solution (physical adsorption)
  (5-a) Perpendicular orientation
  Lecithin, CTAB, Versamid 100, octadecylmalonic acid, etc.
  (5-b) Parallel orientation
  Dibasic fatty acids (for example, $HOOC(CH_2)_nCOOH$ where n is equal to 3 to 11), Versamid 125, crown ether, etc.

An aligning or orienting treatment rather than the application of aligner may also be conducted on the surface of electrode layers. Examples of such aligning treatments are shown below.
(1) Rubbing
  The surface is rubbed in one direction with cotton cloth or absorbent wadding, providing a parallel aligned surface.
(2) Oblique evaporation
  (2-1) Single evaporation
  Oxide such as silicon oxide is evaporated onto the surface at an angle, thereby providing oblique parallel orientation at a shallow incident angle or parallel orientation at a deep incident angle. (Shallow and deep incident angles used herein are small and large angles with respect to the normal to the substrate surface.)
  (2-2) Double evaporation
  A first oxide layer, for example, SiO is formed on the surface by evaporation at a shallow angle and a second oxide layer is then formed by evaporation at a deep angle with the substrate rotated 90°, providing oblique parallel orientation.
  (2-3) Rotational evaporation
  Oxide such as SiO is evaporated onto the surface at an angle while rotating the substrate, providing oblique perpendicular orientation.
(3) Ion beam treatment
  An ion beam is applied to the surface at an angle to etch the surface, providing parallel orientation.
(4) Plasma treatment
  The surface is etched by an oxygen plasma, for example, providing parallel orientation.
(5) Pull coating The substrate is immersed in a polymer solution and pulled up therefrom, providing parallel orientation.

Figure 2:
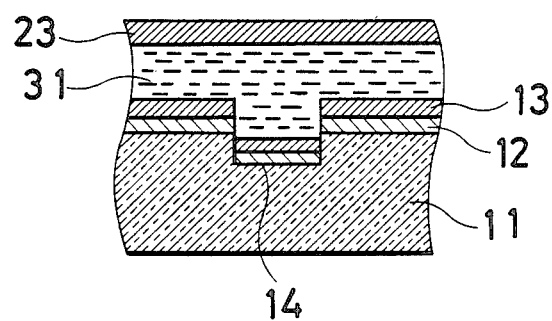
FIG. 2 is a schematic enlarged view of a portion of the medium shown in FIG. 1.

The first substrate on its surface may preferably provided with tracks in the form of channels for the purpose of tracking and orientation control. The track is best shown in FIG. 2 as comprising a channel 14 of substantially rectangular cross section. In general, the tracks or channels may be either concave or convex and of any desired configuration including rectangular, semi-circular, semi-elliptic, V, Ω (omega), and mesa shapes. It is also preferred that the corner of such a configuration be rounded. The size and shape of the track or channel may be adequately selected depending on the orientation properties of liquid crystal used and the desired tracking performance.

The channel may be formed through a transfer process from a stamper by injection or casting. Alternatively, an etching technique using a photopolymer or photoresist may also be used to form the channel. The photopolymer and photoresist may optionally contain any desired additives, for example, aligners, leveling agent, water repellents, oil repellents, silicone resins, fluorine resins, and the like. In the case of photolithography, the light source used may be any of light sources capable of emitting ultraviolet radiation, deep ultraviolet radiation, X-ray, electron radiation, and visible light. Also, the channel may be directly formed through the application of a laser beam.

Although not shown in the drawings, the first substate may be further provided on the electrode layer with a heat insulation layer. Further, the first substrate may be provided with a reflective or translucent reflective layer thereon.

The operation of the optical recording medium will be described.

Figures 3A, 3B:
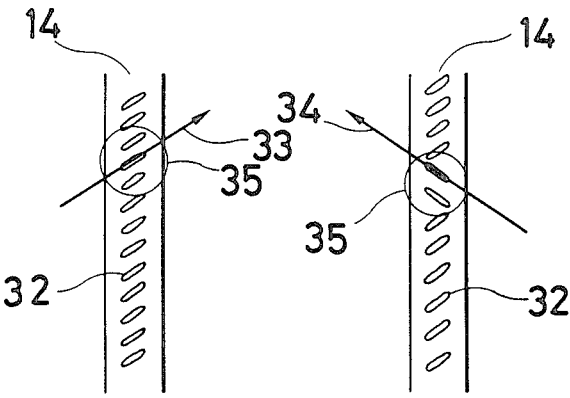
FIGS. 3A and 3B are schematic plan views of the track shown in FIG. 2 before and after writing by beam incidence, respectively.

Referring to FIG. 3A, liquid crystal molecules 32 are illustrated as being oriented or aligned in one direction shown by arrow 33 at a certain angle with respect to a longitudinal axis of the track or channel 14. The liquid crystal molecules have a component parallel to the major surface of the substrate, and most preferably, approximately parallel to the substrate surface.

A laser beam is directed to the recording medium 10 from above the transparent or translucent substrate 21 as shown in FIG. 1. The beam is focused to produce a beam spot 35 on the track or channel 14 as shown in FIG. 3A. The radiation absorbing material in the layer 31 or electrode layer 12 within the spot 35 absorbs radiation to produce heat. At the thus elevated temperature and under an external field, for example, a given electric or magnetic field, the liquid crystal molecules 32 in the spot 35 change their directional orientation. (The electric field is selected such as to permit liquid crystal molecules to remain in the original directional orientation at room temperature, but change their directional orientation at the elevated temperature.) Most preferably, the directional orientation is reversed in the plane of the substrate surface, that is, the liquid crystal molecules 32 in the spot 35 are oriented in a direction shown by arrow 34 in FIG. 3B, the direction 34 being substantially opposite to the original direction 33 with respect to the longitudinal axis of the track or channel 14. In this way, a recorded spot is created which is different in optical characteristics, usually polarization than the surrounding liquid crystal layer. Upon removal of the beam, the spot 35 is quenched so that the liquid crystal molecules in the spot are kept as changed in directional orientation. That is, the recorded spot is maintained.

The recorded spot may be read out by directing a laser beam of lower intensity to the spot and detecting the reflected or transmitted light beam, usually reflected beam, through a polarizer.

Local erasing operation may be carried out by applying an erasing laser beam with an electric or magnetic field applied in the reverse direction. Total erasing operation may be carried out by heating the entire medium or exposing the entire medium to erasing radiation under a given electric field. It is possible to accomplish erasing operation solely by heating without a voltage applied. Erasing operation may also be carried out by changing the pulse width, spot configuration, and intensity of a laser beam.

It should be understood that by controlling the intensity of an external field, for example, electric and magnetic fields, graded or analog recording can be accomplished.

The optical recording medium according to the present invention has the great advantages of significantly improved recording sensitivity and reading S/N ratio. In addition, the storage life is extended, that is, recorded spot are maintained over an extended period of time.

In order to evaluate the optical recording medium of the present invention, we have made a series of experiments.

Experiment

Indium tin oxide (ITO) was evaporated and deposited to a thickness of 0.05 μm on glass substrates each having a plurality of tracks in the form of parallel concave channels of substantially rectangular cross section of 0.9 μm wide and 0.08 μm deep, obtaining first and second substrates with respective electrodes. Vanadyl phthalocyanine (VOPc) or aluminum chloride phthalocyanine (AlClPc) was evaporated and deposited on the electrode on the first substrate to a thickness of 0.08 μm.

Samples were prepared by assembling the first and second substrates with a spacing between the electrodes of 1 μm and filling the spaces between them with smectic liquid crystal mixtures S2 (manufactured by British Dryhouse Company) (sample No. 1) and CNB (cinnamylbiphenyl, manufactured by British Dryhouse Company) (sample No. 2), and high-dielectric liquid crystals LC1, LC3, LC10, and LC6/LC7 (1/1) mixture (sample Nos. 3, 4, 5, and 6).

Dyed samples were prepared by adding 0.08% by weight of dichroic dye NK-2772 (manufactured by Nihon Kanko-Shikiso K.K.) (sample No. 7) and 0.05% by weight of vanadyl phthalocyanine (sample No. 8) to LC1 of the same samples as sample No. 3, respectively. The dichroic dye NK-2772 is a compound having the following structural formula:

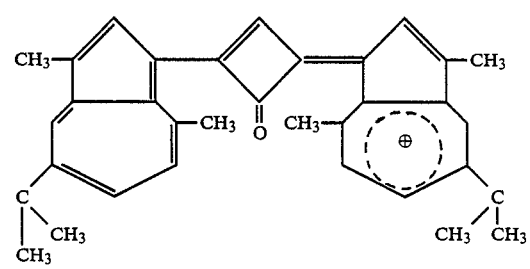

Sample Nos. 9 and 10 were prepared in the same manner as sample Nos. 7 and 8 except that the vanadyl phthalocyanine layer was removed from the first substrate.

Further, sample Nos. 11 and 12 were prepared which were the same as sample Nos. 7 and 8 except that an acrylic photopolymer was coated and photo-cured onto the vanadyl phthalocyanine layer on the first substrate followed by coating with a parallel aligner, KBM 403 (gammaglycidoxypropyl trimethoxysilane manufactured by Shinetsu Kagaku K.K.) to a thickness of 500 Å, and the second substrate was coated on its ITO layer with the same parallel aligner to a thickness of 600 Å.

Sample Nos. 13 and 14 were prepared in the same manner as sample Nos. 3 and 4 except that the layers of ITO and vanadyl phthalocyanine (VOPc) on the first substrate was removed and instead, CdTe was vacuum deposited on the glass substrate to form a radiation absorbing electrode layer having a thickness of 0.1 μm.

Sample Nos. 15 and 16 were prepared in the same manner as sample Nos. 13 and 14 except that the parallel aligner as used for sample Nos. 11 and 12 were applied.

Writing operation was conducted in these samples along their tracks or channels by directing a laser beam from a GaAlAs laser source on the transparent electrode at a focusing output of 15 mW with a voltage of 40 volts applied across the electrodes. The pulse width of writing beam was varied.

Thereafter, reading operation was conducted using a GaAlAs laser beam at a focusing output of 0.8 mW. The pulse width of writing beam providing an S/N ratio of reflected beam of 50 dB was recorded as the inverse of sensitivity.

Further, the S/N ratio upon reading was measured by writing with a writing beam having a pulse width of 200 nsec. and reading with the same reading beam as used above.

The recorded samples were stored for three months near the upper limit temperature of the respective liquid crystal phase temperature range in order to evaluate how S/N ratio was deteriorated during storage.

The results are shown in Table 1.

TABLE 1

| Sample No. | Electrode layer | Electrode Absorber | Liquid crystal | Liquid Crystal Absorber | Aligner | Inverse of writing sensitivity (nsec.) | Reading S/N ratio (dB) | S/N ratio after storage (dB) |
|---|---|---|---|---|---|---|---|---|
| 1* | ITO | VOPc | S2 | — | — | 270 | 37 | 10 |
| 2* | ITO | VOPc | CNB | — | — | 260 | 36 | 10 |
| 3 | ITO | VOPc | LC1 | — | — | 70 | 55 | 49 |
| 4 | ITO | VOPc | LC3 | — | — | 60 | 54 | 52 |
| 5 | ITO | VOPc | LC10 | — | — | 70 | 54 | 51 |
| 6 | ITO | AlClPc | LC6 + LC7 | — | — | 80 | 57 | 50 |
| 7 | ITO | VOPc | LC1 | NK2772 | — | 50 | 56 | 56 |
| 8 | ITO | VOPc | LC1 | VOPc | — | 45 | 62 | 58 |
| 9 | ITO | — | LC1 | NK2772 | — | 72 | 54 | 53 |
| 10 | ITO | — | LC1 | VOPc | — | 69 | 53 | 52 |
| 11 | ITO | VOPc | LC1 | — | KBM403 | 30 | 65 | 61 |
| 12 | ITO | VOPc | LC1 | — | KBM403 | 28 | 64 | 62 |
| 13 | CdTe | — | LC1 | — | — | 110 | 52 | 51 |
| 14 | CdTe | — | LC3 | — | — | 109 | 51 | 50 |
| 15 | CdTe | — | LC1 | — | KBM403 | 100 | 51 | 50 |
| 16 | CdTe | — | LC3 | — | KBM403 | 99 | 52 | 51 |

*comparison

Microscopic observation through a polarizer revealed that the liquid crystal molecules were aligned in one direction and after writing, their directional orientation was changed in an opposite direction with respect to the longitudinal axis of the track. Of course, the directional orientation of liquid crystal molecules in samples containing the aligner was superior to aligner-free samples.

What is claimed is:

1. An optical recording medium comprising
   a substrate having an electrode layer thereon,
   a transparent substrate having a transparent electrode layer thereon,
   an optical recording layer containing a high-dielectric smectic liquid crystal having a chiral carbon disposed between the electrode layer on the substrate and the transparent electrode layer on the transparent substrate which face each other, and said optical recording medium comprising radiation absorbing means capable of
   absorbing radiation to product sufficient heat to provide a change of directional orientation of the liquid crystal.

2. The optical recording medium of claim 1 wherein said radiation absorbing means comprises a radiation absorbing layer applied to the electrode layer on the substrate.

3. The optical recording medium of claim 2 wherein said radiation absorbing layer is comprised of a dye.

4. The optical recording medium of claim 2 wherein said radiation absorbing layer is comprised of a phthalocyanine.

5. The optical recording medium of claim 1 wherein said radiation absorbing means comprises a radiation absorbing, electroconductive layer which also serves as the electrode layer.

6. The optical recording medium of claim 2 or 5 wherein said recording layer further contains a dye.

7. The optical recording medium of claim 6 wherein said dye is a dichroic dye.

8. The optical recording medium of claim 6 wherein said dye is a phthalocyanine.

9. The optical recording medium of claim 1 wherein said radiation absorbing means comprises a dye which is contained in said recording layer.

10. The optical recording medium of claim 9 wherein said dye is a dichroic dye.

11. The optical recording medium of claim 9 wherein said dye is a phthalocyanine.

12. The optical recording medium of claim 1 which further comprises a layer of an aligner on at least one of said electrode layers.

13. The optical recording medium of claim 1 wherein the substrate is provided on its surface having an electrode layer thereon with at least one track, the liquid crystal molecules are normally oriented in one direction in the track and their orientation is changed to another direction when heated.

* * * * *